US012182211B2

(12) United States Patent
Kretschmer et al.

(10) Patent No.: US 12,182,211 B2
(45) Date of Patent: Dec. 31, 2024

(54) MATCHING ONLINE ACCOUNTS WITH OVERLAPPING CHARACTERISTICS BASED ON NON-HOMOGENOUS DATA TYPES

(71) Applicant: The Knot Worldwide Inc., Chevy Chase, MD (US)

(72) Inventors: Matthias Kretschmer, Chevy Chase, MD (US); Steven Baehr, Chevy Chase, MD (US)

(73) Assignee: The Knot Worldwide Inc., Chevy Chase, MD (US)

( * ) Notice: Subject to any disclaimer, the term of this patent is extended or adjusted under 35 U.S.C. 154(b) by 338 days.

(21) Appl. No.: 17/678,872

(22) Filed: Feb. 23, 2022

(65) Prior Publication Data

US 2023/0267155 A1 Aug. 24, 2023

(51) Int. Cl.
*G06F 16/951* (2019.01)
*G06F 16/903* (2019.01)
*G06F 18/22* (2023.01)
*G06F 40/205* (2020.01)

(52) U.S. Cl.
CPC ...... *G06F 16/951* (2019.01); *G06F 16/90344* (2019.01); *G06F 18/22* (2023.01); *G06F 40/205* (2020.01)

(58) Field of Classification Search
None
See application file for complete search history.

(56) References Cited

U.S. PATENT DOCUMENTS

| | | | | |
|---|---|---|---|---|
| 7,324,918 B1* | 1/2008 | Brown | ................... | G16H 50/80 714/25 |
| 7,493,233 B1* | 2/2009 | Brown | ................... | G06F 40/216 714/25 |
| 7,877,258 B1* | 1/2011 | Chelba | ................... | G06F 40/216 704/240 |
| 10,606,991 B2* | 3/2020 | Brison | ................... | G06F 21/56 |
| 11,853,696 B2* | 12/2023 | Horesh | ................ | G06F 40/166 |
| 2009/0171910 A1* | 7/2009 | Sarkeshik | ............. | G06Q 10/00 |
| 2014/0214808 A1* | 7/2014 | Satoh | ..................... | G06F 16/93 707/722 |
| 2015/0161529 A1* | 6/2015 | Kondaji | ............... | G06Q 10/063 705/7.11 |
| 2018/0039647 A1* | 2/2018 | Winstanley | ......... | G06F 16/9535 |
| 2018/0097800 A1* | 4/2018 | Parikh | ................ | H04L 63/0815 |
| 2018/0233150 A1* | 8/2018 | Gruenstein | ............ | G10L 15/30 |
| 2020/0125639 A1* | 4/2020 | Doyle | .................... | G06F 40/30 |

(Continued)

*Primary Examiner* — Tarek Chbouki
*Assistant Examiner* — Loan T Nguyen
(74) *Attorney, Agent, or Firm* — Perkins Coie LLP

(57) ABSTRACT

In certain embodiments, a first plurality of values associated with a first account and a second plurality of values associated with a second account may be received. A first value of the first plurality of values that corresponds to an event date may be determined. An event date window may be determined based on the first value. The first plurality of values and the second plurality of values may be compared using a matching algorithm to determine a similarity likelihood. The matching algorithm may modify weights for matches detected between the first plurality of values and the second plurality of values based on the event date window. A match recommendation for the first account and the second account may be generated for display based on the similarity likelihood.

16 Claims, 7 Drawing Sheets

(56) References Cited

U.S. PATENT DOCUMENTS

2021/0294797 A1\* 9/2021 Gupta ................. G06F 21/6254
2023/0196016 A1\* 6/2023 Horesh ................. G06F 40/232
                                                           715/256

\* cited by examiner

MATCHING ONLINE ACCOUNTS WITH OVERLAPPING CHARACTERISTICS BASED ON NON-HOMOGENOUS DATA TYPES

BACKGROUND OF THE INVENTION

In recent years, the drive to move to online interactions or online experiences has exponentially increased. As a by-product of this drive, the number of online accounts and user registries has exponentially increased. Moreover, for security and privacy reasons, as well as to expand the available selection, users are frequently encouraged to have multiple accounts and there is no centralized address system for these accounts.

SUMMARY OF THE INVENTION

In view of these problems, methods, apparatuses, and/or systems for matching online accounts are described. Specifically, the methods, apparatuses, and/or systems recite improvements for matching online accounts with overlapping characteristics, especially those with non-homogenous data types, incomplete data, and/or a temporal element.

As described above, users increasingly have multiple online accounts. Each of the accounts may be located with a different provider (e.g., an entity hosting an account and/or with which the account is registered) and in a different computer domain (e.g., network, platform, etc.). As the accounts correspond to different providers and in different computer domains, conventional systems relied on unique identifiers for the account (e.g., an account number) to identify the account. However, the unique identifiers for the account, as the name suggests, is unique to each system. Thus, there is little value to conventional systems in attempting to use this information to match accounts for different providers and/or in different computer domains.

At best, conventionally, systems have attempted to rely on data that may be unique to a user associated with the account (e.g., an email address). For example, an email address is uniquely associated with a user or an account as two users or accounts at different domains do not share the same email address.

However, changes to privacy laws may cause domain providers to be less likely to share these unique identifiers. Similarly, the rise in the use of "virtual" email accounts (e.g., one-time use addresses that are set up to forward to a "real" email address for a user) has made the use of an email address in matching accounts unreliable. Accordingly, the methods, apparatuses, and/or systems for matching online accounts move beyond solely using unique identifiers to match accounts. Instead, to increase reliability in matching accounts across disparate computer systems, the methods, apparatuses, and/or systems use other data types and may match online accounts by analyzing data of these other data types for overlapping characteristics.

However, this creates a new technical challenge as many users may share one or more characteristics. For example, a first data type corresponding to a first partial user identifier (e.g., first name) and a second data type corresponding to a second partial user identifier (e.g., last name) may have exponentially large numbers of different users corresponding to at least one of these characteristics. Similarly, another technical challenge arises as some accounts may have different characteristics even though the accounts should be matched. For example, a user may have not populated the first data type for both accounts (e.g., a user did not enter a first name) or a user may have used different variations for the first data type (e.g., entering "Jonathan" in one account and "Jon" in the other). Despite these differences, the methods, apparatuses, and/or systems still need to identify a match between the accounts.

In view of these technical challenges, methods and systems are described herein for matching online accounts with overlapping characteristics based on non-homogenous data types. For example, the methods and systems describe a matching algorithm that detects matches for online accounts with overlapping characteristics based on non-homogenous data types. In particular, the matching algorithm may adjust the weights corresponding to different matches (or failures to match). The methods and systems may then generate a similarity likelihood for two accounts as opposed to necessarily determining that two accounts do not match based on values for corresponding data types being incorrect, missing, and/or in an incorrect format. The system may then compare this similarity likelihood to a threshold similarity likelihood.

However, beyond simply using weights and determining similarity likelihoods, the matching algorithm, in some embodiments, adjusts the weights based on a temporal element detected in the data. For example, the matching algorithm gives particular weight to an event date associated with either of the multiple accounts. In particular, the matching algorithm applies a separate date function that captures a temporal relationship between an identified event date in either online account or the likelihood of a match. For example, the separate date function ensures that the matching algorithm increases the likelihood of a match between two accounts as the proximity of an identified event date increases. For example, the separate data function may provide an absolute window for detecting matches or a dynamically-weighted window for detecting matches.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
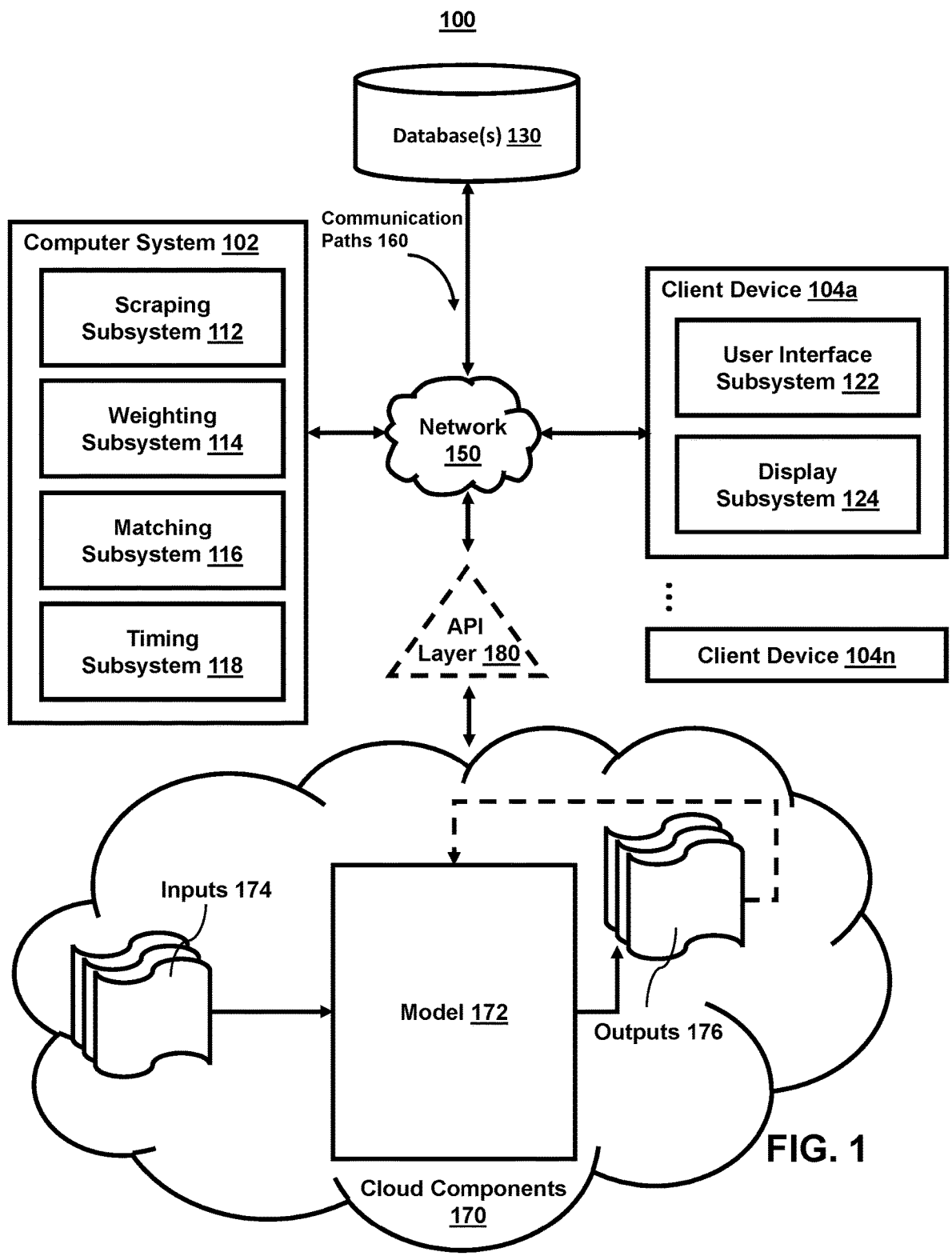
FIG. 1 shows a system for facilitating matching of online accounts with overlapping characteristics based on non-homogenous data types, in accordance with one or more embodiments.

FIG. 1 shows a system 100 for facilitating matching of online accounts with overlapping characteristics based on non-homogenous data types, in accordance with one or more embodiments. As shown in FIG. 1, system 100 may include computer system 102, client device(s) 104 (or client devices 104a-104n), or other components. Computer system 102 may include scraping subsystem 112, weighting subsystem 114, matching subsystem 116, timing subsystem 118, or other components. Each client device 104 may include user interface subsystem 122, display subsystem 124, or other components. Each client device 104 may include any type of mobile terminal, fixed terminal, or other device. By way of example, client device(s) 104 may include a desktop computer, a notebook computer, a tablet computer, a smartphone, a wearable device (e.g., augmented reality glasses or goggles), or another client device. Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device(s) 104.

In some embodiments, system 100 may facilitate matching of online accounts with overlapping characteristics based on non-homogenous data types. For example, system 100 may include a database 130 of online accounts for various users. An online account may be an arrangement by which a user is given personalized access to a website or program. In some embodiments, an account may store information about and preferences of the user relating to the website. The accounts may include gift registries or other online accounts for users. Gift registries may also be referred to as wish lists. Gift registries may include a list of gift items (or gifts) that a gift registrant or gift recipient would like to receive. Some gift registries may be associated with an event. For example, gift registries may be wedding registries, baby shower registries, birthday registries, anniversary registries, graduation registries, or any other type of gift registry. Such gift registries may, in addition to gift information, have event information such as type and date of the associated event. Each gift registry may be associated with the online account for the gift registrant or gift recipient.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

System 100 also includes communication paths 160. Communication paths 160 may include the Internet, a mobile phone network, a mobile voice or data network (e.g., a 5G or LTE network), a cable network, a public switched telephone network, or other types of communications networks or combinations of communications networks. Communication paths 160 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

System 100 also includes cloud components 170. Cloud components 170 may alternatively be any computing device as described above and may include any type of mobile terminal, fixed terminal, or other device. For example, cloud components 170 may be implemented as a cloud computing system and may feature one or more component devices. It should also be noted that system 100 is not limited to these devices. Users may, for instance, utilize one or more devices to interact with one another, one or more servers, or other components of system 100. It should be noted that, while one or more operations are described herein as being performed by particular components of system 100, those operations may, in some embodiments, be performed by other components of system 100. As an example, while one or more operations are described herein as being performed by components of client device 104, those operations may, in some embodiments, be performed by components of cloud components 170. In some embodiments, the various computers and systems described herein may include one or more computing devices that are programmed to perform the described functions. Additionally, or alternatively, multiple users may interact with system 100 and/or one or more components of system 100. For example, in one embodiment, a first user and a second user may interact with system 100 using two different components.

Figure 2A:
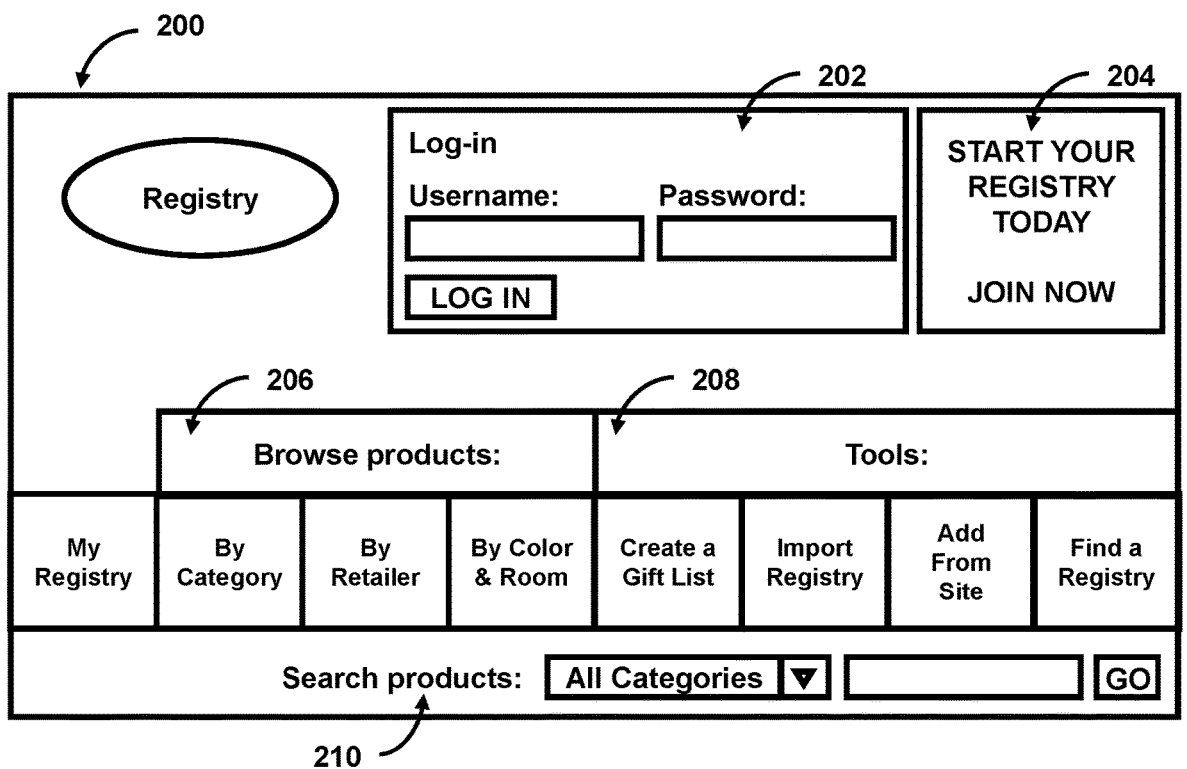
FIGS. 2A and 2B show user interfaces for online accounts, in accordance with one or more embodiments.
Figure 2B:
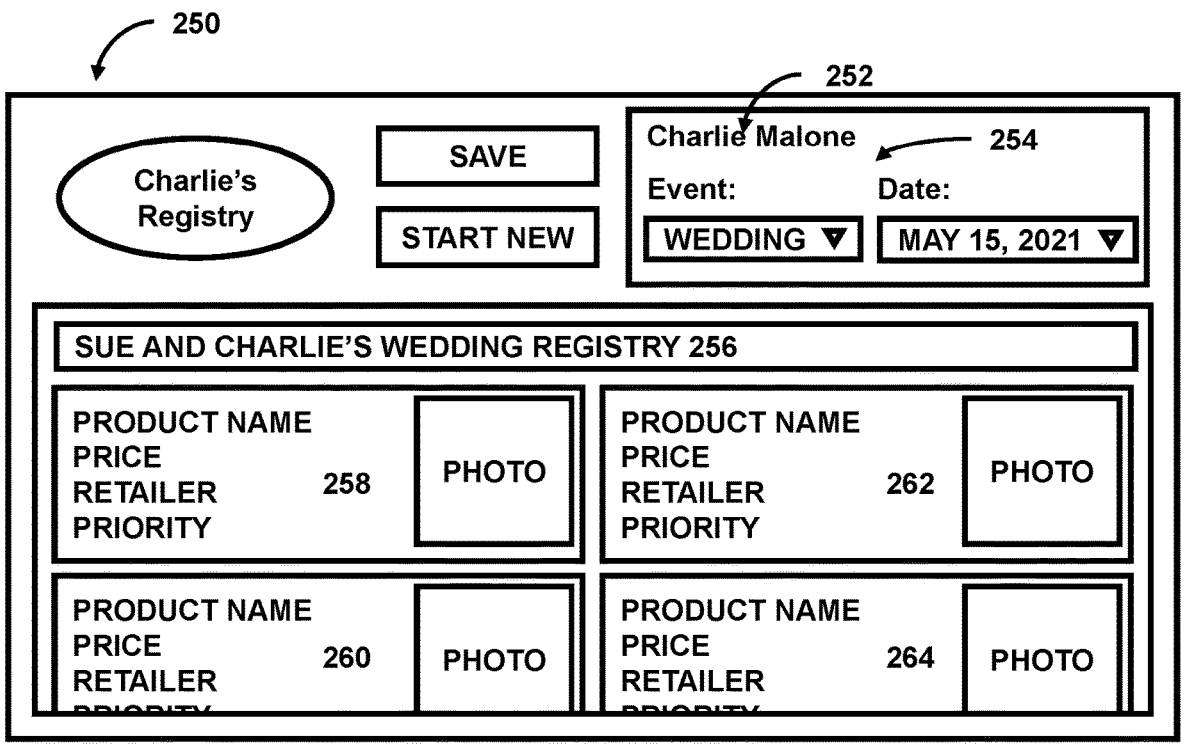

With respect to the components of computer system 102, database 130, client device 104, and cloud components 170, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data (e.g., as shown in FIGS. 2A-B).

Cloud components 170 may be a database configured to store user data for a user. For example, the database may include user data that the system has collected about the user through prior interactions, both actively and passively. Alternatively, or additionally, the system may act as a clearing house for multiple sources of information about the user. This information may be compiled into a user profile. Cloud components 170 may also include control circuitry configured to perform the various operations needed to generate a match. For example, the cloud components 170 may include cloud-based storage circuitry configured to generate a match. Cloud components 170 may also include cloud-based control circuitry configured to run processes to determine a match. Cloud components 170 may also include cloud-based input/output circuitry configured to display a match.

Cloud components 170 may include model 172, which may be a machine learning model (e.g., as described in FIG. 2). Model 172 may take inputs 174 and provide outputs 176. The inputs may include multiple datasets such as a training dataset and a test dataset. Each of the plurality of datasets (e.g., inputs 174) may include data subsets related to user data, accounts, and/or a predicted match. In some embodiments, outputs 176 may be fed back to model 172 as input to train model 172 (e.g., alone or in conjunction with user indications of the accuracy of outputs 176, labels associated with the inputs, or with other reference feedback information). For example, the system may receive a first labeled feature input, wherein the first labeled feature input is labeled with a known match for the first labeled feature input. The system may then train the first machine learning model to classify the first labeled feature input with the known match.

In another embodiment, model 172 may update its configurations (e.g., weights, biases, or other parameters) based on the assessment of its prediction (e.g., outputs 176) and reference feedback information (e.g., user indication of accuracy, reference labels, or other information). In another embodiment, where model 172 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 172 may be trained to generate better predictions.

In some embodiments, model 172 may include an artificial neural network. In such embodiments, model 172 may include an input layer and one or more hidden layers. Each neural unit of model 172 may be connected with many other neural units of model 172. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 172 may be self-learning and trained, rather than explicitly programmed and can perform significantly better in certain areas of problem solving as compared to traditional computer programs. During training, an output layer of model 172 may correspond to a classification of model 172 and an input known to correspond to that classification may be input into an input layer of model 172 during training. During testing, an input without a known classification may be input into the input layer and a determined classification may be output.

In some embodiments, model 172 may include multiple layers (e.g., where a signal path traverses from front layers to back layers). In some embodiments, back propagation techniques may be utilized by model 172 where forward stimulation is used to reset weights on the "front" neural units. In some embodiments, stimulation and inhibition for model 172 may be more free-flowing, with connections interacting in a more chaotic and complex fashion. During testing, an output layer of model 172 may indicate whether or not a given input corresponds to a classification of model 172 (e.g., a match of accounts).

In some embodiments, model 172 may predict a match. For example, the system may determine that particular characteristics are more likely to be indicative of a type of a match. In some embodiments, the model (e.g., model 172) may automatically perform actions based on output 176. In some embodiments, the model (e.g., model 172) may not perform any actions on a user's account.

System 100 also includes API layer 180. In some embodiments, API layer 180 may be implemented on any device (or between any connection of two devices) in system 100. Alternatively or additionally, API layer 180 may reside on one or more of cloud components 170. API layer 180 (which may be A REST or Web services API layer) may provide a decoupled interface to data and/or functionality of one or more applications. API layer 180 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages including Ruby, Java, PHP, and JavaScript. SOAP Web services have traditionally been adopted in the enterprise for publishing internal services as well as for exchanging information with partners in B2B transactions.

API layer 180 may use various architectural arrangements. For example, system 100 may be partially based on API layer 180, such that there is strong adoption of SOAP and RESTful Web-services, using resources like Service Repository and Developer Portal but with low governance, standardization, and separation of concerns. Alternatively, system 100 may be fully based on API layer 180, such that separation of concerns between layers like API layer 180, services, and applications are in place.

In some embodiments, the system architecture may use a microservice approach. Such systems may use two types of layers: Front-End Layer and Back-End Layer where microservices reside, in this kind of architecture, the role of the API layer 180 may provide integration between Front-End and Back-End. In such cases, API layer 180 may use RESTful APIs (exposition to front-end or even communication between microservices). API layer 180 may use AMQP (e.g., Kafka, RabbitMQ, etc.). API layer 180 may use incipient usage of new communications protocols such as gRPC, Thrift, etc.

In some embodiments, the system architecture may use an open API approach. In such cases, API layer 180 may use commercial or open source API Platforms and their modules. API layer 180 may use developer portal. API layer 180 may use strong security constraints applying WAF and DDoS protection, and API layer 180 may use RESTful APIs as standard for external integration.

FIG. 2A shows a user interface 200 for an online account, in accordance with one or more embodiments. For example, user interface 200 may be a login page for a gift registry. User interface 200 may include login fields 202, a sign-up field 204, and one or more capabilities to interact with the site, such as a product browser 206, tools 208, and search fields 210. Computer system 102 may cause a client device associated with the user (e.g., client device 104a) to display user interface 200 to a user interacting with a retail or third-party site (e.g., via user interface subsystem 122 or display subsystem 124). The user may interact with user interface 200 to browse the registry, sign up, log in, or perform other actions available to the user.

FIG. 2B shows a user interface 250 for an online account, in accordance with one or more embodiments. User interface 250 shows a gift registry for a user (e.g., Charlie Malone). In some embodiments, user interface 250 may represent a page that a client device 104a (e.g., user interface subsystem 122 or display subsystem 124) presents to a user subsequent to the user logging into their account via user interface 200. User interface 250 may include an identifier 252 (e.g., first and last name), event information 254 (e.g., event type and date), a registry 256 (e.g., wedding registry), and registry items 258, 260, 262, and 264. In some embodiments, the registry items may include product names, prices, retailers, priorities (e.g., rankings by the user), photos, and other details.

In some embodiments, each user may have multiple online accounts. Each of the accounts may be located with a different provider and in a different computer domain (e.g., retailer). In some embodiments, the user may desire to identify any accounts associated with their information. For example, the user may wish to locate a wish list or registry that was created by the user or for the user. In some embodiments, a retailer may desire to match users with existing accounts associated with the users. For example, a user may interact with a website of the retailer in an attempt to locate an account associated with the user, and the retailer may match the user with the user's account. In some embodiments, a third party may desire to match users with existing accounts associated with the users. For example, a user may interact with a website of the third party in an attempt to locate an account associated with the user, and the third party may match the user with the user's account. In another example, the third party may create an account for the user without the user's knowledge, and the third party may match the user with the created account when the user interacts with a website of the third party or a search engine. In some embodiments, a user may be associated with two accounts for two separate retailers, and a third party may match the accounts with each other. Other scenarios may arise in which a user needs to match with an account.

In some embodiments, computer system 102 may store account details for various accounts associated with users. In some embodiments, computer system 102 may cause cloud-based storage to store account details for various accounts associated with users. For example, computer system 102 may store first account details for a first account, second account details for a second account, and so on. The account details for each account may include various data types. For example, the data types may be identifiers, partial identifiers, event types, event dates, event locations, wish lists, or other data types. As referred to herein, an identifier may be a sequence of characters used to identify or refer to an individual. For example, an identifier may be a code or number, first name, last name, or other identifier. As referred to herein, a partial identifier may be an abbreviated identifier, such as a nickname. As referred to herein, an event date may be any kind of designation which refers to a temporal element. In some embodiments, an event date may be a time or day associated with one or more account characteristics.

For example, an event may be associated with an event date specifying the calendar date, day of the week, time of day, or other temporal descriptors. As referred to herein, an event location may be any kind of designation which refers to a position element. For example, an event location may be a venue, an address, a city or town, a county, a region, a state, a country, a continent, or any other position designation. As referred to herein, a wish list may be a list of desired things or occurrences. For example, a wish list may include a list of desired gifts or services in relation to an event.

Computer system 102 may store values corresponding to each data type. For example, returning to FIG. 2B, user interface 250 includes multiple data types (e.g., identifier 252, event information 254 including event type and date, and registry 256). Each data type is populated with one or more values. For example, identifier 252 is populated with "Charlie Malone," event information 254 is populated with "Wedding" and "May 15, 2021," and registry 256 is populated with registry items 258, 260, 262, and 264. Computer system 102 may store each value for each respective data type locally, in the cloud-based storage, in database 130 (e.g., as shown in FIG. 1), or elsewhere.

In some embodiments, computer system 102 may store (e.g., in cloud-based storage) a matching algorithm. For example, a matching algorithm may match accounts via matching emails, names, wedding dates, addresses, spouse names, wedding venues, or other details or by manual comparison. As referred to herein, a match may be a pair that corresponds or is very similar. For example, a match between two accounts may indicate that the two accounts reflect similar information or relate to the same person or event. However, oftentimes computer system 102 receives non-homogenous data entries that render direct matching algorithms ineffective. In some embodiments, computer system 102 may store a matching algorithm that is able to match online accounts using non-homogenous data. As referred to herein, non-homogenous data may be data that is non-uniform or not the same.

In some embodiments, computer system 102 may retrieve information that the matching algorithm compares to determine matching accounts. For example, computer system 102 may determine a website corresponding to a first account associated with a user. The first account may be a registry, a user profile, or another website. Computer system 102 (e.g., scraping subsystem 112) may execute a web-scraping routine on the web site to determine a plurality of values associated with the first account. As referred to herein, a web-scraping routine may be the process of crawling a website and copying data from the website using a computer program. The values may correspond to respective data types. For example, the values associated with the first account may be identifiers (e.g., first name, last name, or other identifier), event information (e.g., event date, event type, or other event information), or other values.

In some embodiments, scraping subsystem 112 may determine a first value of the first plurality of values that corresponds to a first respective data type. For example, the first respective data type may be an event date, and the value of the first data type may be the date of the event with which the first account is associated. In some embodiments, computer system 102 (e.g., timing subsystem 118) may determine an event date window based on the value of the event date. For example, the event date window may be a range of dates surrounding the event date. In some embodiments, this may provide room for error when searching for matching accounts (e.g., if a user enters a date that is slightly incorrect, if an event date was moved, or for other circumstances). In some embodiments, the event date window may include a certain length of time on each side of the event date. For example, the event date window may include a two week time period before and after the event date. In some embodiments, the event date window may be shorter (e.g., to narrow down a search for matching accounts) or longer (e.g., to include more possible matches).

In some embodiments, to determine the event date window, timing subsystem 118 may determine an absolute date range for a match with a value for an event date associated with the second account. Timing subsystem 118 may determine that the event date window is a window that includes both the value for the event date associated with the first account and the value for the event date associated with the second account as endpoints of the event date window. In some embodiments, timing subsystem 118 may determine that the event date window is a window that includes the value for the event date associated with the first account at the center of the window and the value for the event date associated with the second account as one endpoint (e.g., the start or end of the window), with the other endpoint being a same distance from the center of the window.

In some embodiments, computer system 102 (e.g., matching subsystem 116) may compare the plurality of values associated with the first account (e.g., as discussed above) with a plurality of values associated with a second account. For example, the second account may be a new account for which matching subsystem 116 is searching for a match. In some embodiments, the second account may be another existing account (e.g., on a site for a different vendor or third party) for which matching subsystem 116 is searching for a match. In some embodiments, the second account may be a user profile for which matching subsystem 116 is searching for a match. In some embodiments, the second account may be associated with another user (e.g., a spouse, event guest, friend, or family member of the user of the first account). In some embodiments, the second account may be unaffiliated with the user of the first account.

Figure 3A:
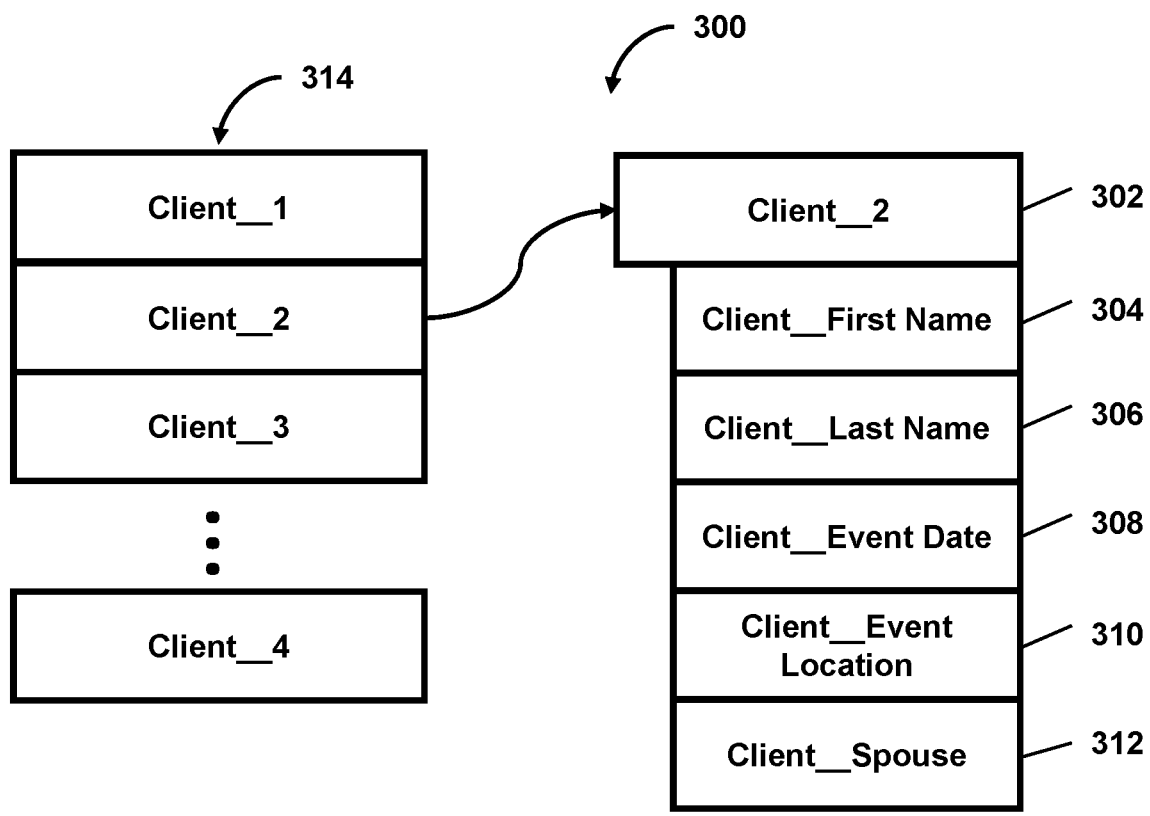
FIGS. 3A and 3B show account data structures, in accordance with one or more embodiments.

In some embodiments, matching subsystem 116 may compare first values associated with the first account with second values associated with the second account. In some embodiments, the values may be stored in data structures containing all values associated with each account. For example, FIG. 3A shows account data structures 300, in accordance with one or more embodiments. Data structures 314 may include a data structure for each account. Each data structure (e.g., data structure 302) may include values organized by the respective data types. For example, data structure 302 may include a first name 304, a last name 306, an event date 308, an event location 310, a spouse name 312, or other values.

Figure 3B:
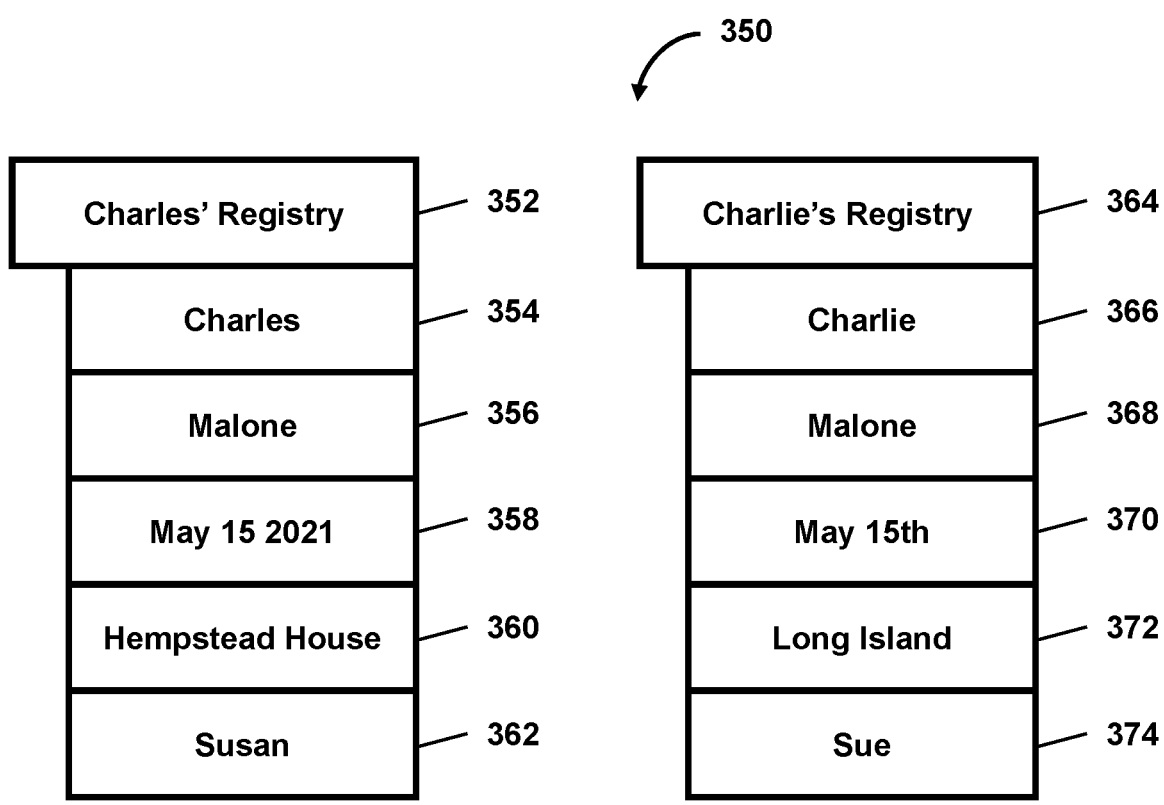

FIG. 3B shows account data structures 350, in accordance with one or more embodiments. For example, the first data structure 352 may correspond to Charles' Registry and may be associated with a first account. The second data structure 364 may correspond to Charlie's Registry and may be associated with a second account. In some embodiments, matching subsystem 116 may determine a similarity likelihood of the first data structure 352 and the second data structure 364 based on a comparison of the values associated with the first account and the values associated with the second account. For example, matching subsystem 116 may compare first name 354 with first name 366, last name 356 with last name 368, event date 358 with event date 370, event location 360 with event location 372, and spouse name 362 with spouse name 374. A matching algorithm (e.g., stored in cloud-based storage, as discussed previously) may perform the comparison to determine the similarity likelihood.

The matching algorithm (e.g., matching subsystem 116) may be an n-gram parser or another type of matching algorithm. An n-gram parser may provide approximate matching capabilities by converting a sequence of items to a set of n-grams. The n-grams may be contiguous sequences of n-items (e.g., two items, three items, etc.) of each value of the respective data types of the first and second accounts. For example, the n-gram parser may convert each value of the first account and the second account to single character n-grams (e.g., 2-grams, 3-grams, etc.). For the first name 354, using a 3-gram parser, the 3-grams would be cha, har, arl, rle, les, es, and s. For the first name 366, the 3-grams would be cha, har, arl, rli, lie, ie, and e. The n-gram parser may compare the 3-grams of the first name 354 and the first name 366 to determine a number of n-grams in common. In this example, the first name 354 and the first name 366 have three 3-grams in common (i.e., cha, har, and arl). In some embodiments, other n-gram parsers may be used (e.g., 2-gram, 4-gram, etc.).

In some embodiments, the n-gram parser may divide the number of n-grams in common between the two values by a total number of n-grams in the first value and the second value. For example, the total number of n-grams in the first value and the second value in the above example is seven (i.e., cha, har, arl, rle, les, es, s, rli, lie, ie, e). The n-gram parser may then divide three (i.e., the number of n-grams in common) by seven (i.e., the total number of n-grams) to determine a point value. In this example, the point value is $3/11$. In some embodiments, matching subsystem 116 may determine a similarity likelihood between the first and second accounts based on the point value. Matching subsystem 116 may convert the point value to a decimal or percentage and may round the value. For example, matching subsystem 116 may convert $3/11$ to 0.28 or 28%. In some embodiments, the similarity likelihood may comprise the point value or percentage, a score (e.g., confidence score) based on the point value or percentage or some other likelihood. In some embodiments, a rating may be based on ranges (e.g., 0-20% is unlikely, 21-80% is possible, 81-100% is likely) or some other criteria. In some embodiments, matching subsystem 116 may utilize other methods of determining the similarity likelihood based on the point value.

In some embodiments, matching subsystem 116 may determine a similarity likelihood for a comparison of each value associated with the first account with the corresponding value of the second account. For example, last name 356 and last name 368 has a point value (e.g., using a 3-gram parser) of 1, which corresponds to a similarity likelihood of 100%, indicating a direct match, and so on. In some embodiments, matching subsystem 116 may determine the overall similarity likelihood between the first account and the second account by combining the similarity likelihoods or point values for each value comparison. In some embodiments, the n-gram parser may parse a first string that includes all of the values associated with the first account and a second string that includes all of the values associated with the second account (e.g., instead of parsing each value separately). For example, in the example discussed above, the first string may be charlesmalonemay152021hempsteadhousesusan and the second string may be charliemalonemay15thlongislandsue. Matching subsystem 116 may determine the overall similarity likelihood for the first account and the second account based on the point value from the n-gram parser of the first string and the second string.

In some embodiments, matching subsystem 116 may determine additional information for certain data types. For example, for event location (e.g., event location 360 and event location 372), matching subsystem 116 may determine, for a given value, broader categories to which the given value belongs. For example, event location 360 is Hempstead House, which is a wedding venue. Matching subsystem 116 may determine a town, county, region, state, and country in which the wedding venue is located. Matching subsystem 116 may similarly determine the broader categories to which event location 372 belongs. This may allow matching subsystem 116 to identify non-homogenous matches that differ in specificity.

For example, Hempstead House is a wedding venue located on Long Island, and while the n-gram parser would calculate a point value of zero between Hempstead House and Long Island, matching subsystem 116 may nonetheless determine that Hempstead House and Long Island are somewhat similar. In some embodiments, matching subsystem 116 may run the n-gram parser on a string comprising all identified categories associated with a location from the first account (i.e., Hempstead House) and a string comprising all identified categories associated with a location from the second account (i.e., Long Island). In some embodiments, matching subsystem 116 may determine a similarity likelihood based on the distance between the categories of each value. For example, Hempstead House is a venue, while Long Island is an island. Matching subsystem 116 may assign a higher similarity likelihood between Hempstead House and Sands Point, NY (i.e., the town in which Hempstead House is located), since the categories are closer, than between Hempstead House and Long Island. On the other hand, matching subsystem 116 may assign a lower similarity likelihood between Hempstead House and New York State (i.e., the state in which Hempstead House is located), since the categories are further apart, than between Hempstead House and Long Island. In some embodiments, matching subsystem 116 may utilize other methods of comparing non-homogenous data types.

In some embodiments, computer system 102 (e.g., weighting subsystem 114) may determine a series of weight amounts for weighting matches detected between the first values associated with the first account and the second values associated with the second account based on the event date window. As referred to herein, a weight or weight amount is an amount given to increase or decrease the importance of an item. In some embodiments, weighting subsystem 114 may determine a second value of the second plurality of values associated with the second account that corresponds to a first respective data type (e.g., event date). In other words, weighting subsystem 114 may determine an event date associated with the second account. Weighting subsystem 114 may then determine whether the second value (i.e., the event date) corresponds to the event date window. For example, weighting subsystem 114 may determine whether the event date associated with the second account falls within the event date window. In some embodiments, if the event date of the second account falls within the event date window, weighting subsystem 114 may increase the weights for matches detected between first values of the first account and the second values of the second account.

In some embodiments, weighting subsystem 114 may increase the weights for matches detected between first values of the first account and the second values of the second account based on a proximity of an event date associated with the second account to the event date of the first account. For example, if the event date associated with the second account is closer to the event date of the first account, weighting subsystem 114 may weight the second account more heavily than if the event date of the second account is further from the event date of the first account. In some embodiments, matches may be weighted such that each weight corresponds to a day within the event date window and is based on a proximity to the event date. In one example, an event date value associated with the second account that is at the edge of the event date window (e.g., four days from the event date, where the event date window stretches four days on either side of the event date) may be given one weight. An event date value associated with the second account that is three days from the event date (e.g., either before or after the event date) may be given two weights. An event date value associated with the second account that is two days from the event date may be given three weights, and an event date value associated with the second account that is one day from the event date may be given four weights. In some embodiments, if the event date value associated with the second account is equal to the event date, the second account may be assigned a higher weight (e.g., five or more weights). In some embodiments, any other weighting schemes may be used based on the event date and event date window.

In some embodiments, matching subsystem 116 may determine an overall similarity likelihood based on a combination of the factors discussed above. For example, matching subsystem 116 may determine an overall similarity likelihood based on the point values that the n-gram parser calculated, the weights that weighting subsystem 114 assigned, the additional information of the values (e.g., categories of the values) that the matching subsystem 116 determined, and any additional factors. In some embodiments, the weights may be applied to accounts that are determined to be possible or likely matches based on the n-gram parse. For example, the n-gram parser may determine that two accounts are equally possible matches with a third account. However, one account may have an event date that is much closer to an event date of the third account and therefore that account may be weighted more heavily. In another example, one account may have an event date that is within an event date window of the event date of the third account (while the other is not) and therefore that account may be weighted more heavily. In some embodiments, matching subsystem 116 may combine the aforementioned factors in other ways in order to determine an overall similarity likelihood.

In some embodiments, matching subsystem 116 may compare the similarity likelihood to a threshold similarity likelihood to determine whether or not to recommend a match to a user. For example, to determine the threshold similarity likelihood, matching subsystem 116 may determine a current date and, based on the current date, a proximity of the event date to the current date. For example, if the current date is Apr. 2, 2021 and the event date is May 15, 2021, the proximity may be forty-three days. In some embodiments, the threshold similarity likelihood may depend on the proximity of the current date to the event date. For example, the threshold similarity likelihood may be lower when the current date is in closer proximity to the event date and higher when the current date is further from the event date. This may reflect the tendency of users to access registries for events with impending dates (e.g., a wedding that is a week away) over events with distant dates (e.g., a wedding that is over a year away). In some embodiments, if the event date window includes the current date, the threshold similarity likelihood may be lower. If the event date window does not include the current date, the threshold similarity likelihood may be higher. The threshold similarity likelihood may thus depend on the proximity.

Once matching subsystem 116 has determined the threshold similarity likelihood, matching subsystem 116 may compare the similarity likelihood to the threshold similarity likelihood to determine whether to generate for display a match recommendation. As referred to herein, a match recommendation is an account that has been determined to be somewhat similar to another account. For example, a match recommendation may be accounts with the highest similarity likelihoods. In some embodiments, if the similarity likelihood satisfies the threshold similarity likelihood, matching subsystem 116 may generate for display a match recommendation. In some embodiments, if the similarity likelihood does not satisfy the threshold similarity likelihood, matching subsystem 116 may not generate for display a match recommendation.

Figure 4:
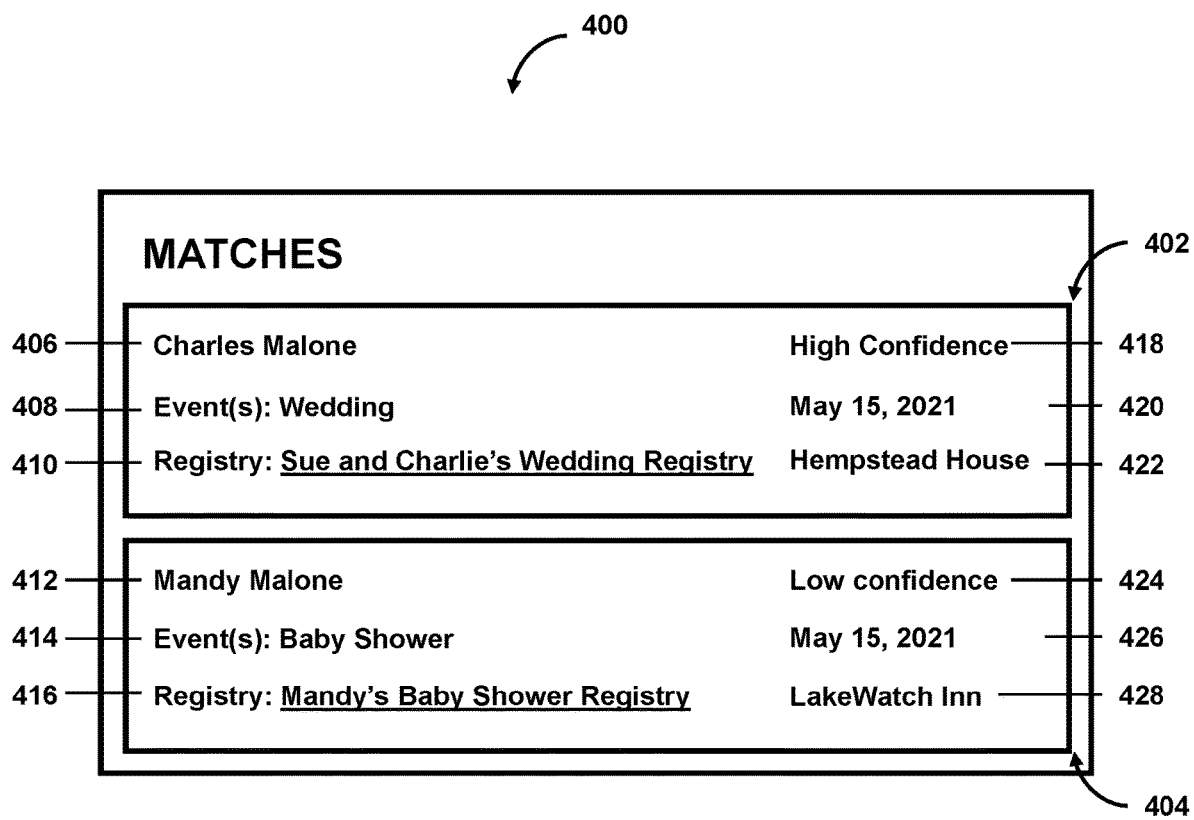
FIG. 4 shows match recommendations, in accordance with one or more embodiments.

In response to matching subsystem 116 determining that the similarity likelihood satisfies the threshold similarity likelihood, matching subsystem 116 may generate a match recommendation for display (e.g., via user interface subsystem 122 or display subsystem 124, as shown in FIG. 1). In some embodiments, the match recommendation may be based on the similarity likelihood between the first account and the second account. For example, FIG. 4 shows match recommendations 400, in accordance with one or more embodiments. In some embodiments, match recommendations 400 may include a first match recommendation 402 associated with a first account and a second match recommendation 404 associated with a second account. The first match recommendation 402 may include a name 406 (e.g., the name of the registrant or gift recipient), an event type 408, a link to an event registry 410, a confidence score 418 (e.g., based on the point value, similarity likelihood, additional similarity determinations, proximity of the event, other information, or a combination of factors), an event date 420, and an event location 422.

Second match recommendation 404 may include corresponding details for the second account. For example, the second match recommendation 404 may include a name 412 (e.g., the name of the registrant or gift recipient), an event type 414, a link to an event registry 416, a confidence score 424, an event date 426, and an event location 428. In some embodiments, the second match recommendation 404 may be the second closest match that matching subsystem 116 found. In some embodiments, matching subsystem 116 may display all matches that satisfied the threshold similarity likelihood. In some embodiments, matching subsystem 116 may generate all matches satisfying the threshold similarity likelihood, for example, ranked according to confidence in descending order. This may allow a user to view all potential matches and identify the correct account from the matches.

In some embodiments, the user may interact with match recommendations 400. For example, the user may select a correct match (e.g., a match corresponding to the correct event or gift registrant). In some embodiments, if the user selects the correct match, matching subsystem 116 may link the match with an account of the user. For example, if the user has an existing account (e.g., a first account) and identifies a matching account (e.g., a second account) from match recommendations 400, matching subsystem 116 may link the first account with the second account. The link may allow the user to log into both accounts, view information from both accounts, edit both accounts, share both accounts, or otherwise access both accounts. In some embodiments, the link may allow the user to view and purchase items from both accounts.

In some embodiments, the link may combine both accounts into a single account (e.g., the first account or the second account) so that the information from both accounts is captured in a single account. For example, returning to FIG. 3B, matching subsystem 116 may combine the first data structure 352 with the second data structure 364. In some embodiments, matching subsystem 116 may cause the new data structure to be populated with multiple values for each respective data type (e.g., location may include Hempstead House and Long Island, and first name may include Charles and Charlie) or the most accurate value for each respective data type (e.g., May 15, 2021 may override May 15th for the event date), or matching subsystem 116 may use a variety of techniques to combine the data structures.

In some embodiments, matching subsystem 116 may populate the combined data structure for the new combined account with additional metadata such that users may more easily search for and identify the new combined account. For example, matching subsystem 116 may cause scraping subsystem 112 to scrape the first account, the second account, and web sites associated with information in the first and second accounts. For example, scraping subsystem 112 may scrape a website for the Hempstead House and may store, within the combined data structure, metadata relating to the Hempstead House. Metadata may include alternative identifiers (e.g., Gould-Guggenheim Estate or Sands Point Preserve), descriptive terms (e.g., historic, estate, castle, etc.), location information (e.g., 127 Middle Neck Road, Sands Point, North Shore, Nassau County, etc.), or other metadata. Matching subsystem 116 may incorporate the retrieved metadata into the data structure of the new combined account.

Computer system 102 may utilize these and other methods of identifying possible matching accounts based on non-homogenous data, weighting the possible matches based on a variety of factors, and displaying possible matches that satisfy a threshold similarity likelihood. In some embodiments, the possible matches may be linked or combined as described above or using other methods.

Figure 5:
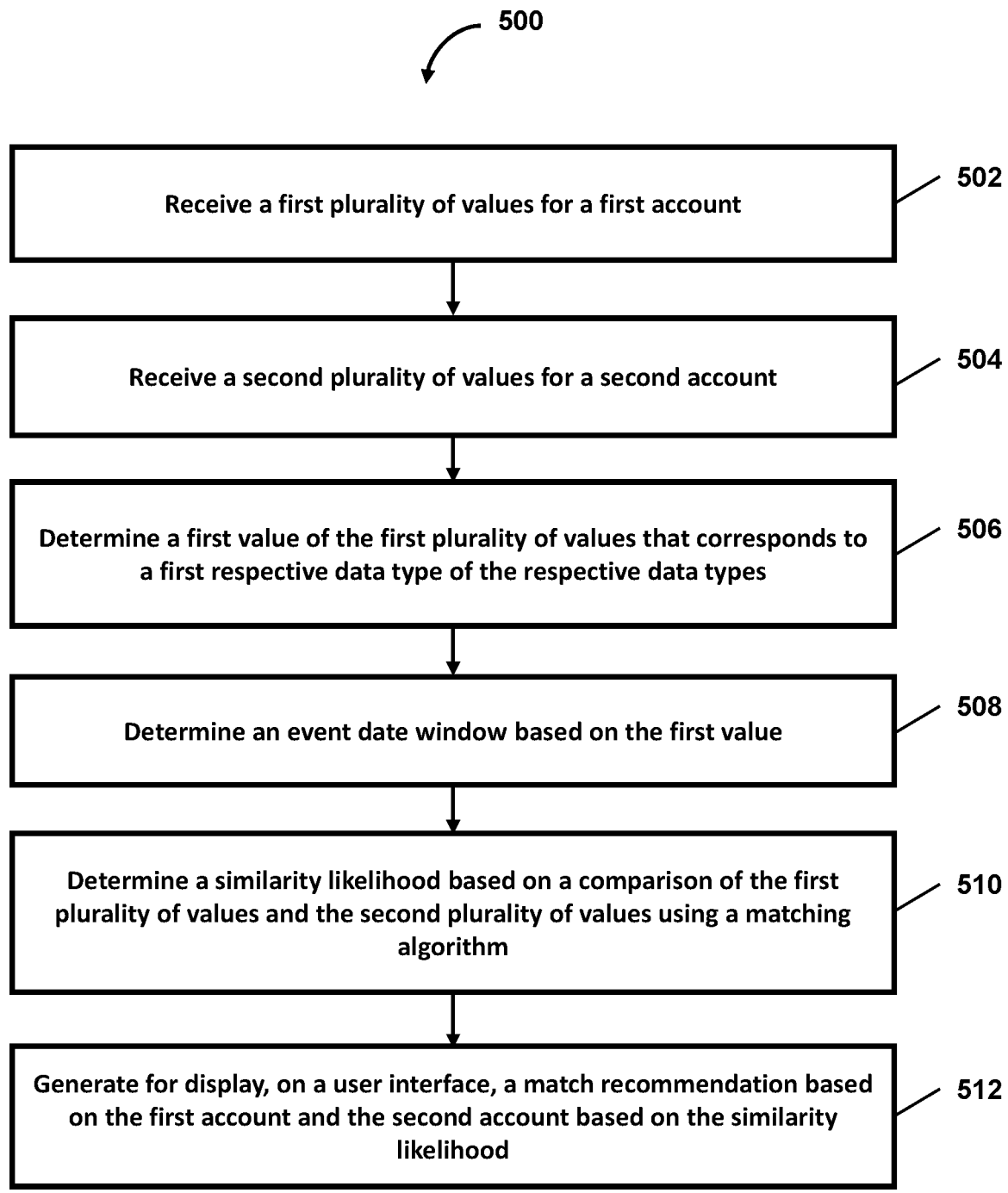
FIG. 5 shows a flowchart of a method of facilitating matching of online accounts with overlapping characteristics based on non-homogenous data types, in accordance with one or more embodiments.

FIG. 5 is an example flowchart of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 5 shows a flowchart of process 500 for facilitating matching of online accounts with overlapping characteristics based on non-homogenous data types, in accordance with one or more embodiments. In an operation 502, process 500 receives a first plurality of values for a first account. In some embodiments, the first plurality of values for the first account may correspond to respective data types. For example, the respective data types may include identifiers, partial identifiers, event types, event dates, event locations, wish lists, other associated accounts, or other data types. In some embodiments, the system may store the first plurality of values for the first account using cloud-based circuitry. Process 500 may perform operation 502 by a system that is the same as or similar to computer system 102, in accordance with one or more embodiments.

In an operation 504, process 500 may receive a second plurality of values for a second account. In some embodiments, the second plurality of values for the second account may correspond to the respective data types. As discussed above, the respective data types may include identifiers, partial identifiers, event types, event dates, event locations, wish lists, other associated accounts, or other data types. In some embodiments, the system may store the second plurality of values for the second account using cloud-based circuitry. Process 500 may perform operation 504 by a system that is the same as or similar to computer system 102, in accordance with one or more embodiments.

In an operation 506, process 500 may determine a first value of the first plurality of values to correspond to a first respective data type of the respective data types. For example, the system may determine that the first value corresponds to a first respective data type (e.g., event date) by scraping a website associated with the first account. The scraping may entail a web-scraping routine for retrieving values from the first account. Process 500 may perform operation 506 by a subsystem that is the same as or similar to scraping subsystem 112, in accordance with one or more embodiments.

In an operation 508, process 500 may determine an event date window based on the first value. For example, the event date window may be a range of dates surrounding the event date. In some embodiments, the event date window may include a certain length of time on each side of the event date. In some embodiments, the event date window may be shorter or longer. In some embodiments, to determine the event date window, the system may determine an absolute date range for a match with a value for an event date associated with the second account. For example, the system may determine that the event date window is a window that includes both the value for the event date associated with the first account and the value for the event date associated with the second account as endpoints of the event date window. In some embodiments, the system may determine that the event date window is a window that includes the value for the event date associated with the first account at the center of the window and the value for the event date associated with the second account as one endpoint (e.g., the start or end of the window), with the other endpoint being a same distance from the center of the window. Process 500 may perform operation 508 by a subsystem that is the same as or similar to timing subsystem 118, in accordance with one or more embodiments.

In an operation 510, process 500 may determine a similarity likelihood. For example, the system may base the similarity likelihood on a comparison of the first plurality of values with the second plurality of values. In some embodiments, the system may determine the similarity likelihood based on a matching algorithm. For example, the matching algorithm may modify weights for matches detected between the respective data types of the first plurality of values and the second plurality of values based on the event date window. In some embodiments, the matching algorithm may include an n-gram parser or another type of matching algorithm. An n-gram parser may provide approximate matching capabilities by converting a sequence of items to a set of n-grams. The n-grams may be contiguous sequences of n-items (e.g., two items, three items, etc.) of each value of the respective data types of the first and second accounts. For example, the n-gram parser may convert each value of the first account and the second account to single character n-grams or may convert a string of all values of the first account and a string of all values of the second account into single character n-grams. The matching algorithm may then perform a comparison of the n-grams from the first and second accounts to determine how many n-grams match. The matching algorithm may divide the number of n-grams that match with the total number of n-grams to determine a point value. The matching algorithm may then determine a similarity likelihood based on the point value. Process 500 may perform operation 510 by a subsystem that is the same as or similar to matching subsystem 116, in accordance with one or more embodiments.

In an operation 512, process 500 may generate for display a match recommendation based on the first account and the second account based on the similarity likelihood. For example, the system may generate the match recommendation for display on a user interface. In some embodiments, the system may compare the similarity likelihood with a threshold similarity likelihood. In some embodiments, the system may determine the threshold similarity likelihood based on the event date window. For example, if the event date window includes the current date, the threshold similarity likelihood may be lower. If the event date window does not include the current date, the threshold similarity likelihood may be higher. Process 500 may perform operation 512 by a subsystem that is the same as or similar to matching subsystem 116, in accordance with one or more embodiments.

In some embodiments, the various computers and subsystems illustrated in FIG. 1 may include one or more computing devices that are programmed to perform the functions described herein. The computing devices may include one or more electronic storages (e.g., database(s) 130 or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., Ethernet, fiber optics, coaxial cable, Wi-Fi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.).

The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-118, subsystems 122-124, and/or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-118 and subsystems 122-124 described herein is for illustrative purposes and is not intended to be limiting, as any of subsystems 112-118 or subsystems 122-124 may provide more or less functionality than is described. For example, one or more of subsystems 112-118 or subsystems 122-124 may be eliminated, and some or all of its functionality may be provided by other ones of subsystems 112-118 or subsystems 122-124. As another example, additional subsystems may be programmed to perform some or all of the functionality attributed herein to one of subsystems 112-118 or subsystems 122-124.

Although the present invention has been described in detail for the purpose of illustration based on what is currently considered to be the most practical and preferred embodiments, it is to be understood that such detail is solely for that purpose and that the invention is not limited to the disclosed embodiments, but on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: receiving a first plurality of values for a first account, wherein the first plurality of values corresponds to respective data types; receiving a second plurality of values for a second account, wherein the second plurality of values corresponds to the respective data types; determining a first value of the first plurality of values that corresponds to a first respective data type of the respective data types, wherein the first respective data type corresponds to an event date; determining an event date window based on the first value; and determining a similarity likelihood based on a comparison of the first plurality of values and the second plurality of values using a matching algorithm, wherein the matching algorithm modifies weights for matches detected between the respective data types of the first plurality of values and the second plurality of values based on the event date window.

2. The method of embodiment 1, further comprising: generating for display, on a user interface, a match recommendation based on the first account and the second account based on the similarity likelihood.

3. The method of any of embodiments 1-2, wherein modifying the weights for matches detected between the respective data types of the first plurality of values and the second plurality of values based on the event date window comprises: determining a second value of the second plurality of values that corresponds to the first respective data type of the respective data types; determining that the second value corresponds to the event date window; and increasing the weights for matches detected between the respective data types of the first plurality of values and the second plurality of values based on the second value being included in the event date window.

4. The method of any of embodiments 1-3, wherein modifying the weights for matches detected between the respective data types of the first plurality of values and the second plurality of values based on the event date window comprises: determining a second value of the second plurality of values that corresponds to the first respective data type of the respective data types; determining that the second value corresponds to the event date window; and increasing the weights for matches detected between the respective data types of the first plurality of values and the second plurality of values based on a proximity of the second value to the event date within the event date window.

5. The method of any of embodiments 1-4, wherein modifying the weights for matches detected between the respective data types of the first plurality of values and the second plurality of values based on the event date window comprises: determining a current date; determining that the current date corresponds to the event date window; and increasing the weights for matches detected between the respective data types of the first plurality of values and the second plurality of values based on the current date being included in the event date window.

6. The method of any of embodiments 1-5, wherein determining an event date window based on the first value comprises determining an absolute date range for a match with a second value of the second plurality of values that corresponds to the first respective data type of the respective data types.

7. The method of any of embodiments 1-6, wherein determining an event date window based on the first value comprises determining a series of weight amounts for weighting matches detected between the respective data types of the first plurality of values and the second plurality of values based on the event date window, wherein the amount of each of the series of weight amounts corresponds to a day within the event date window and is based on a proximity to the event date.

8. The method of any of embodiments 1-7, wherein the respective data types further comprise: a second respective data type that corresponds to a first partial identifier; a third respective data type that corresponds to a second partial identifier; a fourth respective data type that corresponds to a first location identifier; and a fifth respective data type that corresponds to a second location identifier.

9. The method of any of embodiments 1-8, wherein the matching algorithm comprises an n-gram parser, and wherein determining the similarity likelihood based on the comparison of the first plurality of values and the second plurality of values using the matching algorithm, comprises: determining a first string of n-grams based on the first plurality of values; determining a second string of n-grams based on the second plurality of values; parsing the first string and the second string using the n-gram parser; determining a number of n-grams that match in the first string and the second string; dividing the number by a total number of n-grams in the first string and the second string to determine a point value; and determining the similarity likelihood based on the point value.

10. The method of any of embodiments 1-9, further comprising: determining a current date; determining a threshold similarity likelihood based on a proximity of the event date to the current date; and comparing the similarity likelihood to the threshold similarity likelihood to determine whether to generate for display the match recommendation.

11. The method of any of embodiments 1-10, further comprising: determining a website corresponding to the first account; executing a web-scraping routine on the website; and determining the first plurality of values for the first account based on the web-scraping routine.

12. A tangible, non-transitory, machine-readable medium storing instructions that, when executed by a data processing apparatus, causes the data processing apparatus to perform operations comprising those of any of embodiments 1-11.

13. A system comprising: one or more processors; and memory storing instructions that, when executed by the processors, cause the processors to effectuate operations comprising those of any of embodiments 1-11.

What is claimed is:

1. A system for matching online registry accounts with overlapping characteristics based on non-homogenous data types featuring incomplete data and a temporal element, the system comprising:
   cloud-based storage circuitry configured to:
      store a first plurality of values for a first account, wherein the first plurality of values corresponds to respective data types;
      store a second plurality of values for a second account, where in the second plurality of values corresponds to the respective data types;
      store a matching algorithm; and
   cloud-based control circuitry configured to:
      determine a website corresponding to the first account;
      execute a web-scraping routine on the website to determine the first plurality of values for the first account;
      determine a first value of the first plurality of values that corresponds to a first respective data type of the respective data types, wherein the first respective data type corresponds to an event date;
      determine an event date window based on the first value, wherein the event date window is a range of dates surrounding the event date; and
      determine a similarity likelihood based on a comparison of the first plurality of values and the second plurality of values using the matching algorithm, wherein the matching algorithm modifies weights for matches detected between the respective data types of the first plurality of values and the second plurality of values based on comparing the event date window of the first account to another event date window of the second account, wherein the matching algorithm comprises an n-gram parser, and wherein determining the similarity likelihood based on the comparison of the first plurality of values and the second plurality of values using the matching algorithm, comprises:
         determine a first string of n-grams based on the first plurality of values;
         determine a second string of n-grams based on the second plurality of values;
         parse the first string and the second string using the n-gram parser;
         determine a number of n-grams that match in the first string and the second string;
         divide the number by a total number of n-grams in the first string and the second string to determine a point value; and
         determine the similarity likelihood based on the point value;
      determine a current date;
      determine a threshold similarity likelihood based on a proximity of the event date to the current date; and
      compare the similarity likelihood to the threshold similarity likelihood to determine whether to generate for display a match recommendation; and
   cloud-based input/output circuitry configured to:
      generate for display, on a user interface, the match recommendation based on the first account and the second account based on the similarity likelihood.

2. A method for matching online registry accounts with overlapping characteristics based on non-homogenous data types featuring incomplete data and a temporal element, the method comprising:
   receiving a first plurality of values for a first account, wherein the first plurality of values corresponds to respective data types;
   receiving a second plurality of values for a second account, wherein the second plurality of values corresponds to the respective data types;
   determining a first value of the first plurality of values that corresponds to a first respective data type of the respective data types, wherein the first respective data type corresponds to an event date;
   determining an event date window based on the first value, wherein the event date window is a range of dates surrounding an event date; and;
   determining a similarity likelihood based on a comparison of the first plurality of values and the second plurality of values using a matching algorithm, wherein the matching algorithm modifies weights for matches detected between the respective data types of the first plurality of values and the second plurality of values based on comparing the event date window of the first account to another event date window of the second account, wherein the matching algorithm comprises an n-gram parser, and wherein determining the similarity likelihood based on the comparison of the first plurality of values and the second plurality of values using the matching algorithm, comprises:
 determining a first string of n-grams based on the first plurality of values;
 determining a second string of n-grams based on the second plurality of values;
 parsing the first string and the second string using the n-gram parser;
 determining a number of n-grams that match in the first string and the second string;
 dividing the number by a total number of n-grams in the first string and the second string to determine a point value; and
 determining the similarity likelihood based on the point value;
determining a current date;
determining a threshold similarity likelihood based on a proximity of the event date to the current date;
comparing the similarity likelihood to the threshold similarity likelihood to determine whether to generate for display a match recommendation; and
generating for display, on a user interface, the match recommendation based on the first account and the second account based on the similarity likelihood.

3. The method of claim 2, wherein modifying the weights for matches detected between the respective data types of the first plurality of values and the second plurality of values based on the event date window comprises:
 determining a second value of the second plurality of values that corresponds to the first respective data type of the respective data types;
 determining that the second value corresponds to the event date window; and
 increasing the weights for matches detected between the respective data types of the first plurality of values and the second plurality of values based on the second value being included in the event date window.

4. The method of claim 2, wherein modifying the weights for matches detected between the respective data types of the first plurality of values and the second plurality of values based on the event date window comprises:
 determining a second value of the second plurality of values that corresponds to the first respective data type of the respective data types;
 determining that the second value corresponds to the event date window; and
 increasing the weights for matches detected between the respective data types of the first plurality of values and the second plurality of values based on a proximity of the second value to the event date within the event date window.

5. The method of claim 2, wherein modifying the weights for matches detected between the respective data types of the first plurality of values and the second plurality of values based on the event date window comprises:
 determining a current date;
 determining that the current date corresponds to the event date window; and
 increasing the weights for matches detected between the respective data types of the first plurality of values and the second plurality of values based on the current date being included in the event date window.

6. The method of claim 2, wherein determining an event date window based on the first value comprises determining an absolute date range for a match with a second value of the second plurality of values that corresponds to the first respective data type of the respective data types.

7. The method of claim 2, wherein determining an event date window based on the first value comprises determining a series of weight amounts for weighting matches detected between the respective data types of the first plurality of values and the second plurality of values based on the event date window, wherein the amount of each of the series of weight amounts corresponds to a day within the event date window and is based on a proximity to the event date.

8. The method of claim 2, wherein the respective data types further comprise:
 a second respective data type that corresponds to a first partial identifier;
 a third respective data type that corresponds to a second partial identifier;
 a fourth respective data type that corresponds to a first location identifier; and
 a fifth respective data type that corresponds to a second location identifier.

9. The method of claim 2, further comprising:
 determining a website corresponding to the first account;
 executing a web-scraping routine on the website; and
 determining the first plurality of values for the first account based on the web-scraping routine.

10. A non-transitory, computer-readable medium for matching online registry accounts with overlapping characteristics based on non-homogenous data types featuring incomplete data and a temporal element, comprising instructions that, when executed by one or more processors, cause operations comprising:
 receiving a first plurality of values for a first account, wherein the first plurality of values corresponds to respective data types;
 receiving a second plurality of values for a second account, wherein the second plurality of values corresponds to the respective data types;
 determining a first value of the first plurality of values that corresponds to a first respective data type of the respective data types, wherein the first respective data type corresponds to an event date;
 determining an event date window based on the first value, wherein the event date window is a range of dates surrounding the event date;
 determining a similarity likelihood based on a comparison of the first plurality of values and the second plurality of values using a matching algorithm, wherein the matching algorithm modifies weights for matches detected between the respective data types of the first plurality of values and the second plurality of values based on comparing the event date window of the first account to another event date window of the second account, wherein the matching algorithm comprises an n-gram parser, and wherein determining the similarity likelihood based on the comparison of the first plurality of values and the second plurality of values using the matching algorithm, comprises:
 determining a first string of n-grams based on the first plurality of values;
 determining a second string of n-grams based on the second plurality of values;
 parsing the first string and the second string using the n-gram parser;
 determining a number of n-grams that match in the first string and the second string;

dividing the number by a total number of n-grams in the first string and the second string to determine a point value; and determining the similarity likelihood based on the point value;

determining a current date;

determining a threshold similarity likelihood based on a proximity of the event date to the current date;

comparing the similarity likelihood to the threshold similarity likelihood to determine whether to generate for display a match recommendation; and generating for display, on a user interface, the match recommendation based on the first account and the second account based on the similarity likelihood.

11. The non-transitory, computer-readable medium of claim 10, wherein modifying the weights for matches detected between the respective data types of the first plurality of values and the second plurality of values based on the event date window comprises:

determining a second value of the second plurality of values that corresponds to the first respective data type of the respective data types;

determining that the second value corresponds to the event date window; and increasing the weights for matches detected between the respective data types of the first plurality of values and the second plurality of values based on the second value being included in the event date window.

12. The non-transitory, computer-readable medium of claim 10, wherein modifying the weights for matches detected between the respective data types of the first plurality of values and the second plurality of values based on the event date window comprises:

determining a second value of the second plurality of values that corresponds to the first respective data type of the respective data types;

determining that the second value corresponds to the event date window; and increasing the weights for matches detected between the respective data types of the first plurality of values and the second plurality of values based on a proximity of the second value to the event date within the event date window.

13. The non-transitory, computer-readable medium of claim 10, wherein modifying the weights for matches detected between the respective data types of the first plurality of values and the second plurality of values based on the event date window comprises:

determining a current date;

determining that the current date corresponds to the event date window; and increasing the weights for matches detected between the respective data types of the first plurality of values and the second plurality of values based on the current date being included in the event date window.

14. The non-transitory, computer-readable medium of claim 10, wherein determining an event date window based on the first value comprises determining an absolute date range for a match with a second value of the second plurality of values that corresponds to the first respective data type of the respective data types.

15. The non-transitory, computer-readable medium of claim 10, wherein determining an event date window based on the first value comprises determining a series of weight amounts for weighting matches detected between the respective data types of the first plurality of values and the second plurality of values based on the event date window, wherein the amount of each of the series of weight amounts corresponds to a day within the event date window and is based on a proximity to the event date.

16. The non-transitory, computer-readable medium of claim 10, wherein the respective data types further comprise:

a second respective data type that corresponds to a first partial identifier;

a third respective data type that corresponds to a second partial identifier;

a fourth respective data type that corresponds to a first location identifier; and a fifth respective data type that corresponds to a second location identifier.

* * * * *